(12) United States Patent
Gu et al.

(10) Patent No.: US 9,077,270 B2
(45) Date of Patent: Jul. 7, 2015

(54) MOTOR POSITION AND VELOCITY DETECTING SYSTEM

(71) Applicant: Samsung Electro-Mechanics Co., Ltd., Gyeonggi-do (KR)

(72) Inventors: Bon Young Gu, Gyeonggi-do (KR); Joo Yul Ko, Gyeonggi-do (KR)

(73) Assignee: SAMSUNG ELECTRO-MECHANICS CO., LTD., Gyeonggi-Do (KR)

( * ) Notice: Subject to any disclaimer, the term of this patent is extended or adjusted under 35 U.S.C. 154(b) by 182 days.

(21) Appl. No.: 13/797,741

(22) Filed: Mar. 12, 2013

(65) Prior Publication Data

US 2013/0264978 A1   Oct. 10, 2013

(30) Foreign Application Priority Data

Apr. 9, 2012 (KR) .......................... 10-2012-0036845

(51) Int. Cl.
H02P 6/16 (2006.01)
(52) U.S. Cl.
CPC . *H02P 6/165* (2013.01); *H02P 6/16* (2013.01)
(58) Field of Classification Search
CPC ....... H02P 6/06; B62D 5/0463; H02H 7/0851
USPC ............ 318/400.07, 432, 434, 599, 811, 490
See application file for complete search history.

(56) References Cited

U.S. PATENT DOCUMENTS

2005/0275362 A1* 12/2005 Yamamoto et al. ........... 318/254
2010/0171457 A1* 7/2010 Letor et al. .................... 318/490

FOREIGN PATENT DOCUMENTS

KR   1019990066092     8/1999
KR   1020000066648    11/2000

* cited by examiner

*Primary Examiner* — Karen Masih
(74) *Attorney, Agent, or Firm* — Bracewell & Giuliani LLP; Brad Y. Chin (57) ABSTRACT

Disclosed herein is a motor position and velocity detecting system capable of accurately detecting a position and a velocity of a motor without adding a hall sensor or the number of poles of the motor. The motor position and velocity detecting system includes: a hall sensor outputting hall signals from rotation of a motor; an edge detector detecting edge signals for the hall signals to output edge pulse signals; a peak detector detecting peak signals for the hall signals to output peak pulse signals; a position outputter connected to the edge detector and the peak detector and outputting a position of the motor; and a velocity outputter connected to the edge detector and the peak detector and outputting a velocity of the motor.

19 Claims, 5 Drawing Sheets

MOTOR POSITION AND VELOCITY DETECTING SYSTEM

CROSS REFERENCE(S) TO RELATED APPLICATIONS

This application claims the benefit under 35 U.S.C. Section 119 of Korean Patent Application Serial No. 10-2012-0036845, entitled "Motor Position and Velocity Detecting System" filed on Apr. 9, 2012, which is hereby incorporated by reference in its entirety into this application.

BACKGROUND OF THE INVENTION

1. Technical Field

The present invention relates to a motor position and velocity detecting system, and more particularly, to a motor position and velocity detecting system capable of accurately detecting a position and a velocity of a motor without adding a hall sensor or the number of poles of the motor.

2. Description of the Related Art

Generally, a motor generates rotation force by attaching a magnet to a rotor having at least two polarities and includes a stator having a coil wound therearound and the rotor rotatably installed in the stator, wherein the center of the rotor is provided with a shaft for outputting the rotation force of the rotor to the outside.

The shaft has a plurality of magnets attached to an outer side thereof, wherein the magnets may be uniformly divided and magnetized by a desired number. The magnet may include a hall sensor installed in the vicinity of an outer peripheral surface thereof and measuring a velocity of the motor, wherein the hall sensor has, an output waveform input to a control arithmetic apparatus to allow the velocity of the motor to be measured.

The hall sensor uses a Hall effect that a potential difference is generated in a direction vertical to those of both of current and a magnetic field when the current flows in a conductor or a semiconductor and the magnetic field are applied in a direction vertical to that of the current to generate Hall voltage that is in proportion to the product between the magnetic field and the control current in the direction vertical to those of both of the current and the magnetic field by allowing the current to flow between input terminals and applying the magnetic field to a sensor surface in the direction vertical to that of the current.

This motor includes the magnet attached to the rotor thereof and having at least two poles in order to obtain a magnetic field from a rotating magnetic field of the stator, rotates to change a polarity of the magnet from an N pole into an S pole or from the S pole into the N pole, and obtains an output waveform through the hall sensor installed at an outer side thereof. This output waveform is input to the control arithmetic apparatus and the control arithmetic apparatus senses an adjacent edge to calculate a pulse width and then calculates a current velocity of the motor. Therefore, the velocity and the position of the motor need to be accurately detected.

According to the related art, in order to increase accuracy in detecting the velocity of the motor, the hall sensor or the number of poles of the motor has been added. However, in this method, a manufacturing process of the motor should be changed and an additional cost should be required.

RELATED ART DOCUMENT

Patent Document (Patent Document 1) Korean Patent Laid-Open Publication No. 10-1999-0066092

SUMMARY OF THE INVENTION

An object of the present invention is to provide a motor position and velocity detecting system capable of accurately detecting a position and a velocity of a motor without adding a hall sensor or the number of poles of the motor.

According to an exemplary embodiment of the present invention, there is provided a motor position and velocity detecting system including: a hall sensor outputting hall signals from rotation of a motor; an edge detector detecting edge signals for the hall signals to output edge pulse signals; a peak detector detecting peak signals for the hall signals to output peak pulse signals; a position outputter connected to the edge detector and the peak detector and outputting a position of the motor; and a velocity outputter connected to the edge detector and the peak detector and outputting a velocity of the motor.

The edge pulse signals may be output pulse signals for the hall signal at the moment when a polarity of a magnet of the motor is changed.

The edge pulse signals may be output pulse signals for a rising edge signal and a falling edge signal of the hall signal.

The peak pulse signals may be output pulse signals for maximum and minimum points of a sinusoidal wave for the hall signal.

The position outputter may output the position of the motor by synthetic pulse signals generated by synthesizing the edge pulse signals and the peak pulse signals to each other.

The velocity outputter may output the velocity of the motor by synthetic pulse signals generated by synthesizing the edge pulse signals and the peak pulse signals to each other.

According to another exemplary embodiment of the present invention, there is provided a motor position and velocity detecting system including: a hall sensor outputting hall signals from rotation of a motor; an edge detector detecting edge signals for the hall signals to output edge pulse signals; a peak detector detecting peak signals for the hall signals to output peak pulse signals; a comparator connected to the hall sensor and outputting reference pulse signals for the hall signals; a position outputter connected to the edge detector, the peak detector, and the comparator and outputting a position of the motor; and a velocity outputter connected to the edge detector, the peak detector, and comparator and outputting a velocity of the motor.

The motor position and velocity detecting system may further include a voltage divider connected to the peak detector and providing reference signals to the comparator using the peak pulse signals.

The number of comparators and the number of voltage dividers may be plural.

The edge pulse signals may be output pulse signals for the hall signal at the moment when a polarity of a magnet of the motor is changed.

The edge pulse signals may be output pulse signals for a rising edge signal and a falling edge signal of the hall signal.

The peak pulse signals may be output pulse signals for maximum and minimum points of a sinusoidal wave for the hall signal.

The position outputter may output the position of the motor by synthetic pulse signals generated by synthesizing the edge pulse signals, the peak pulse signals, and the reference pulse signals to each other.

The velocity outputter may output the velocity of the motor by synthetic pulse signals generated by synthesizing the edge pulse signals, the peak pulse signals, and the reference pulse signals to each other.

According to still another exemplary embodiment of the present invention, there is provided a motor position and velocity detecting method including: outputting, in a hall sensor, hall signals from rotation of a motor; detecting edge signals from the hall signals to output edge pulse signals; detecting peak signals from the hall signals to output peak pulse signals; outputting synthetic pulse signals generated by synthesizing the edge pulse signals and the peak pulse signals to each other; detecting positions of pulses adjacent to each other in the synthetic pulse signals to detect a position of the motor; and detecting a velocity of the motor using the number of pulses output from the synthetic pulse signals in a preset period.

The motor position and velocity detecting method may further include, before the outputting of the synthetic pulse signals, outputting reference pulse signals for the hall signals.

The synthetic pulse signals may be generated by synthesizing the edge pulse signals, the peak pulse signals, and the reference pulse signals to each other.

The edge pulse signals may be output pulse signals for a rising edge signal and a falling edge signal of the hall signal.

The peak pulse signals may be output pulse signals for maximum and minimum points of a sinusoidal wave for the hall signal.

DESCRIPTION OF THE PREFERRED EMBODIMENTS

Hereinafter, exemplary embodiments of the present invention will be described with reference to the accompanying drawings. However, the exemplary embodiments are described by way of examples only and the present invention is not limited thereto.

In describing the present invention, when a detailed description of well-known technology relating to the present invention may unnecessarily make unclear the spirit of the present invention, a detailed description thereof will be omitted. Further, the following terminologies are defined in consideration of the functions in the present invention and may be construed in different ways by the intention of users and operators. Therefore, the definitions thereof should be construed based on the contents throughout the specification.

As a result, the spirit of the present invention is determined by the claims and the following exemplary embodiments may be provided to efficiently describe the spirit of the present invention to those skilled in the art.

Hereinafter, the present invention will be described with reference to the accompanying drawings.

Figure 1:
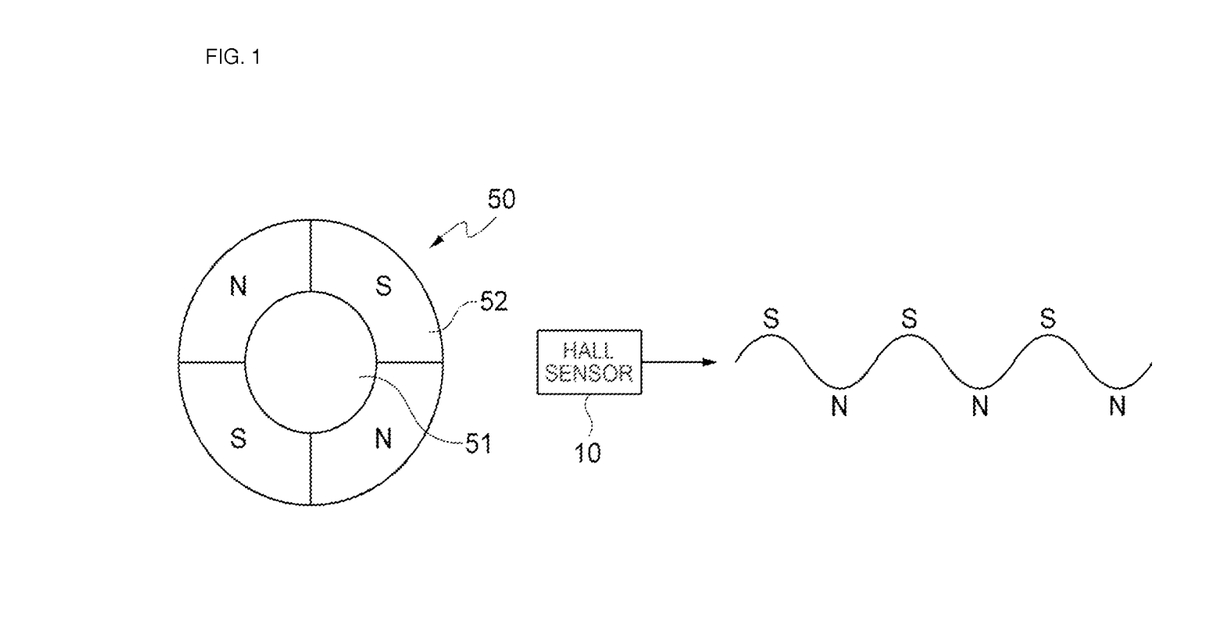
FIG. 1 is a diagram showing shapes of a hall sensor and a magnet according to an exemplary embodiment of the present invention.

FIG. 1 is a diagram showing shapes of a hall sensor and a magnet according to an exemplary embodiment of the present invention.

Referring to FIG. 1, the hall sensor 10 according to the exemplary embodiment of the present invention may output a waveform from a magnet 52 of a rotating motor 50. The motor 50 may include a shaft 51 and the magnet 52, wherein the magnet 52 may include N and S poles. In this case, the motor 50 may include a magnet having four poles or 2n poles (n indicates a natural number). As the shaft 51 of the motor 50 rotates, the magnet 52 rotates, such that the hall sensor 10 may output the waveform in which the N and S poles of the magnet 52 alternate.

As the motor 50 rotates, the hall sensor 10 may output a waveform according to each pole, wherein the waveform may be a sinusoidal wave. In the case in which the N pole of the magnet 52 adjacent to the hall sensor 10 is positioned at a maximal point or a maximum point of the waveform, the S pole of the magnet 52 may be positioned at a minimal point or a minimum point of the waveform. To the contrary, in the case in which the S pole of the magnet 52 adjacent to the hall sensor 10 is positioned at a maximal point or a maximum point of the waveform, the N pole of the magnet 52 may be positioned at a minimal point or a minimum point of the waveform.

Figure 2:
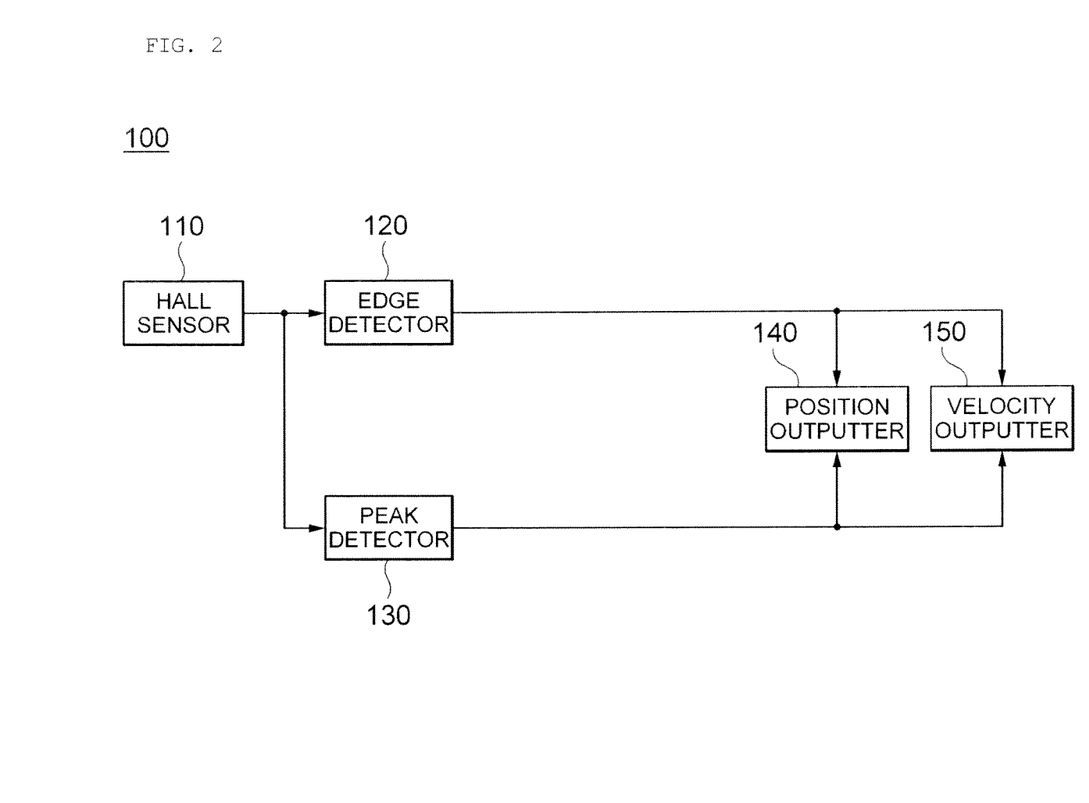
FIG. 2 is a block diagram of a motor position and velocity detecting system according to the exemplary embodiment of the present invention.

FIG. 2 is a block diagram of a motor position and velocity detecting system according to the exemplary embodiment of the present invention; and FIGS. 4A to 4D are output waveform diagrams of a motor according to the embodiment of the present invention.

Referring to FIG. 2, the motor position and velocity detecting system 100 according to the exemplary embodiment of the present invention may be configured to include a hall sensor 110 outputting hall signals from rotation of a motor; an edge detector 120 detecting edge signals for the hall signals to output edge pulse signals; a peak detector 130 detecting peak signals for the hall signals to output peak pulse signals; a position outputter 140 connected to the edge detector 120 and the peak detector 130 and outputting a position of the motor, and a velocity outputter 150 connected to the edge detector 120 and the peak detector 130 and outputting a velocity of the motor.

Figure 4A:
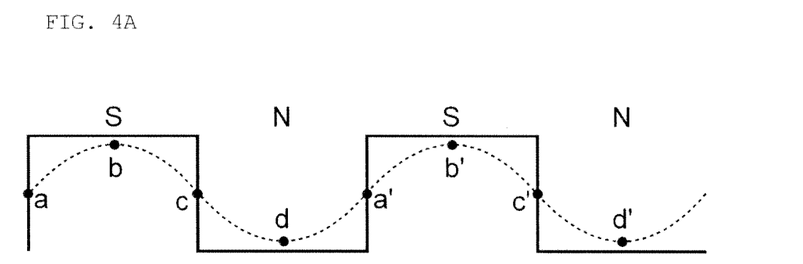
FIGS. 4A to 4D are output waveform diagrams of a motor according to the embodiment of the present invention.

Referring to FIGS. 4A to 4D, the hall signal output from the hall sensor 110 may have a sinusoidal waveform and be modeled as a step function as shown in FIG. 4A.

Figure 4B:
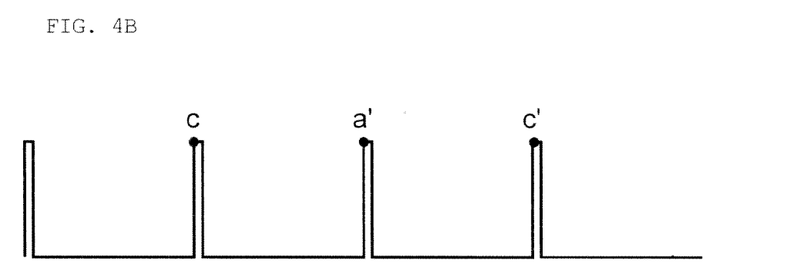

Referring to FIG. 4B, the edge pulse signals may be output pulse signals for the hall signal at the moment when a polarity of the magnet of the motor is changed. In this case, the edge pulse signals may be output pulse signals for a rising edge signal and a falling edge signal of the hall signal. That is, the edge pulse signals may be output at the moment when the polarity of the magnet of the motor is changed from an S pole into an N pole and at the moment when the polarity of the magnet of the motor is changed from the N pole into the S pole. Therefore, in the case in which the magnet of the motor has four poles, four edge pulse signals may be output in one cycle.

Figure 4C:
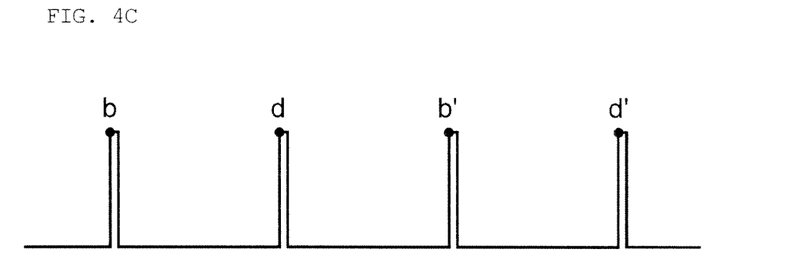

Referring to FIG. 4C, the peak pulse signals may be output pulse signals for the maximum and minimum points of the sinusoidal wave for the hall signal. That is, one peak pulse signal may be output at the maximal or maximum point of the hall signal, and one peak pulse signal may be output at the minimal or minimum point of the hall signal. Therefore, in the case in which the magnet of the motor has four poles, four peak pulse signals may be output in one cycle.

Figure 4D:
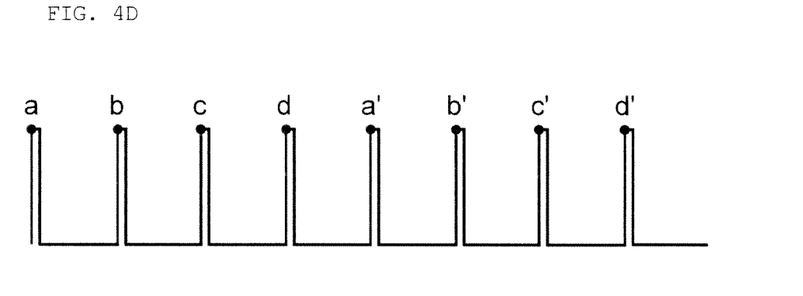

FIG. 4D shows synthetic pulse signals generated by synthesizing the edge pulse signals and the peak pulse signals to each other. The motor position and velocity detecting system according to the exemplary embodiment of the present invention may use the synthetic pulse signals generated by synthesizing the edge pulse signals and the peak pulse signals to each other. Therefore, in the case in which the magnet of the motor has four poles, eight synthetic pulse signals may be output in one cycle.

The position outputter 140 may output the position of the motor by the synthetic pulse signals generated by synthesizing the edge pulse signals and the peak pulse signals to each other. According to the related art, a position of the motor has been estimated using edge pulse signals adjacent to each other or has been estimated using peak pulse signals adjacent to each other. That is, the position of the motor has been detected and output on the assumption that the number of these clocks is maintained until the next edge pulse or the next peak pulse. In this case, when the motor rotates at an accurately constant velocity, a problem is not generated. However, since the motor does not rotate at a constant velocity, the number of pulses needs to be large in order to accurately detect and output the position of the motor. That is, the larger the number of pulses, the higher the accuracy. Therefore, according to the exemplary embodiment of the present invention, since the position of the motor is detected and output by the synthetic pulse signals generated by synthesizing the edge pulse signals and the peak pulse signals to each other, the position of the motor may be accurately detected and output.

The position outputter 150 may output the velocity of the motor by the synthetic pulse signals generated by synthesizing the edge pulse signals and the peak pulse signals to each other. Generally, the velocity of the motor may be calculated by the following Equation 1.

$$N = \frac{60}{\text{Sampled Period}} \times \frac{\text{The Number of Detected Pulses}}{\text{The number of Pulses per One Revolution}} [\text{Unit:rpm}]$$ [Equation 1]

For example, in the case in which a sampled period is 0.1 second, the number of pulses detected during 0.1 second is 90, and the number of pulses per one revolution is 4, N=(60/0.1)*(90/4)=13500 [rpm]. In this case, an error of one pulse becomes (60/0.1)*(1/4)=150 [rpm]. However, when the number of pulses per one revolution becomes 8 which is 2 times larger as compared to the above-mentioned case, the error of one pulse becomes N=(60/0.1)*(1/8)=75 [rpm], such that the accuracy may increase. Therefore, since the velocity outputter detects and outputs the velocity of the motor by the synthetic pulse signals generated by synthesizing the edge pulse signals and the peak pulse signals to each other, the number of pulses increases, such that the accuracy of the velocity measurement may increase. Therefore, according to the exemplary embodiment of the present invention, since the velocity of the motor is detected and output by the synthetic pulse signals generated by synthesizing the edge pulse signals and the peak pulse signals to each other, the velocity of the motor may be accurately detected and output.

In the case in which the magnet of the motor has four poles, according to the related art, four pulses are output in one cycle; however, according to the exemplary embodiment of the present invention, eight synthetic pulse signals may be output in one cycle, such that the output pulses may increase twice as compared to the related art. Therefore, each of the position outputter 140 and the velocity outputter 150 may output the position and the velocity by the synthetic pulse signals increasing twice as compared to the related art.

Figure 3:
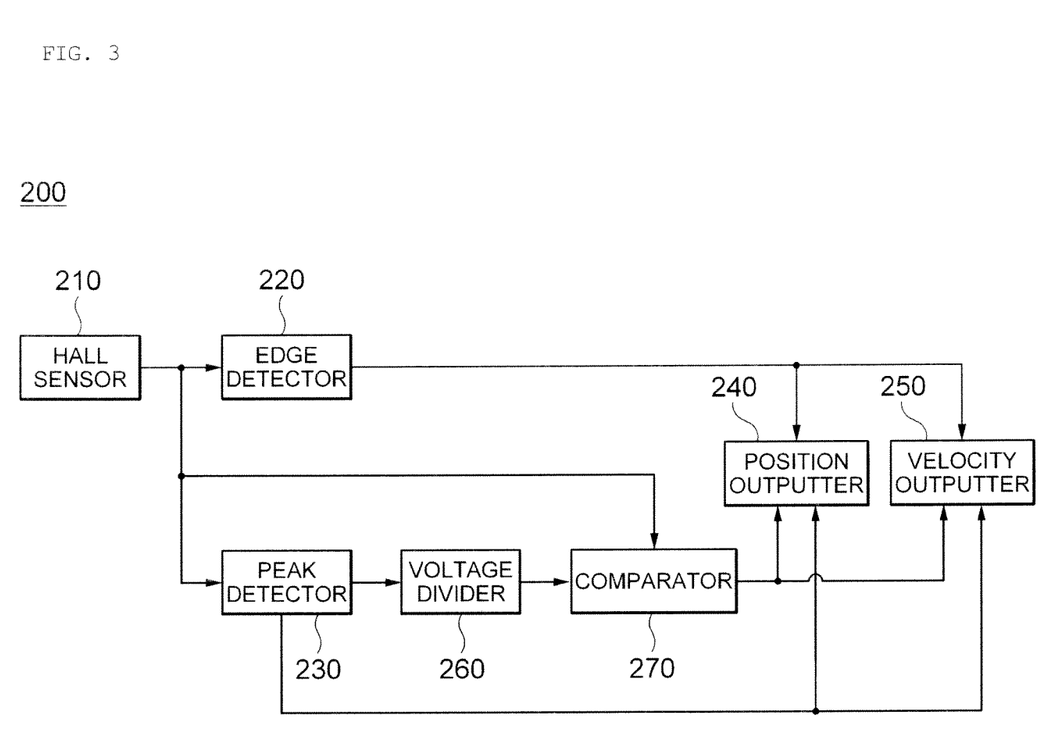
FIG. 3 is a block diagram of a motor position and velocity detecting system according to another exemplary embodiment of the present invention.

FIG. 3 is a block diagram of a motor position and velocity detecting system according to another exemplary embodiment of the present invention; and FIGS. 5A to 5E are output waveform diagrams of a motor according to another exemplary embodiment of the present invention.

Referring to FIG. 3, the motor position and velocity detecting system 200 according to another exemplary embodiment of the present invention may be configured to include a hall sensor 210 outputting hall signals from rotation of a motor; an edge detector 220 detecting edge signals for the hall signals to output edge pulse signals; a peak detector 230 detecting peak signals for the hall signals to output peak pulse signals; a comparator 270 connected to the hall sensor 210 and outputting reference pulse signals for the hall signals; a position outputter 240 connected to the edge detector 220, the peak detector 230, and the comparator 270 and outputting a position of the motor, and a velocity outputter 250 connected to the edge detector 220, the peak detector 230, and the comparator 270 and outputting a velocity of the motor.

Figure 5A:
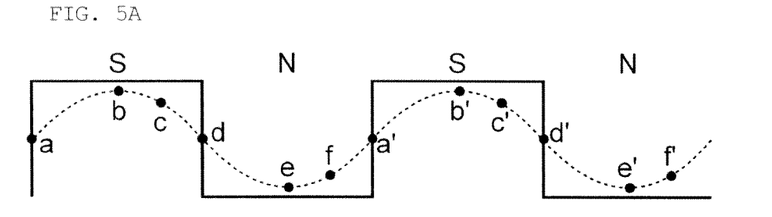
FIGS. 5A to 5E are output waveform diagrams of a motor according to another exemplary embodiment of the present invention.

Referring to FIGS. 5A to 5E, the hall signals output from the hall sensor 210 may have a sinusoidal waveform and be modeled as a step function as shown in FIG. 5A.

Figure 5B:
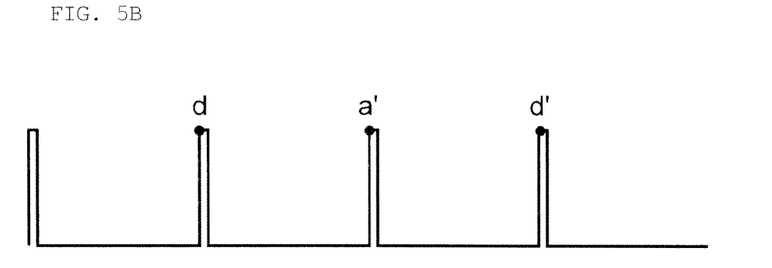

Referring to FIG. 5B, the edge pulse signals may be output pulse signals for the hall signal at the moment when a polarity of the magnet of the motor is changed. In this case, the edge pulse signals may be output pulse signals for a rising edge signal and a falling edge signal of the hall signal. That is, the edge pulse signals may be output at the moment when the polarity of the magnet of the motor is changed from an S pole into an N pole and at the moment when the polarity of the magnet of the motor is changed from the N pole into the S pole. Therefore, in the case in which the magnet of the motor has four poles, four edge pulse signals may be output in one cycle.

Figure 5C:
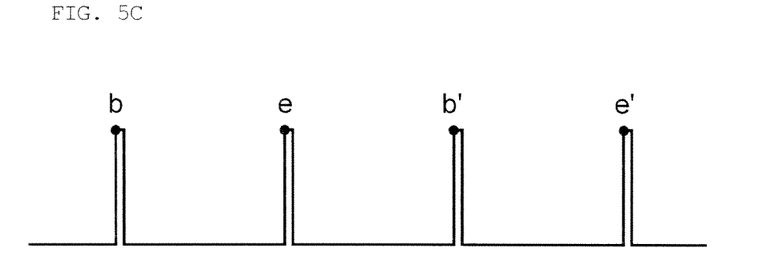

Referring to FIG. 5C, the peak pulse signals may be output pulse signals for maximum and minimum points of the sinusoidal wave for the hall signal. That is, one peak pulse signal may be output at the maximal or maximum point of the hall signal, and one peak pulse signal may be output at the minimal or minimum point of the hall signal. Therefore, in the case in which the magnet of the motor has four poles, four peak pulse signals may be output in one cycle.

Meanwhile, the comparator 270 may be connected to the hall sensor to output the reference pulse signals for the hall signals. In addition, the motor position and velocity detecting system 200 may further include a voltage divider 260 connected to the peak detector 230 and providing reference signals to the comparator 270 using the peak pulse signals.

The comparator 270 may receive the reference signals by the voltage divider 260 and be connected to the hall sensor to receive the hall signals. Therefore, the comparator 270 may simultaneously receive the reference signals and the hall signals and output the hall signals coinciding with the reference signals.

Figure 5D:
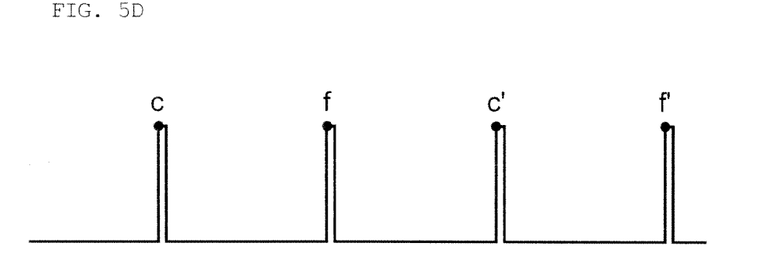

Referring to FIG. 5D, the reference signals may be pulse signals output from the comparator 270. For example, the reference signal output by the voltage divider 260 may be set to a hall signal corresponding to 50% of the maximum or maximal point from an edge point of the hall signal. The reference pulse signal to be output by the voltage divider 260 may be variously set. Therefore, the comparator 270 may compare the set reference signal with the hall signal output from the hall sensor to output the hall signal corresponding to the reference signal, that is, the reference pulse signal. Therefore, in the case in which the magnet of the motor has four poles, four reference pulse signals may be output in one cycle.

The position outputter 240 may output the position of the motor by the synthetic pulse signals generated by synthesizing the edge pulse signals, the peak pulse signals, and the reference pulse signals to each other. In addition, the velocity outputter 250 may output the velocity of the motor by the synthetic pulse signals generated by synthesizing the edge pulse signals, the peak pulse signals, and the reference pulse signals to each other.

Figure 5E:
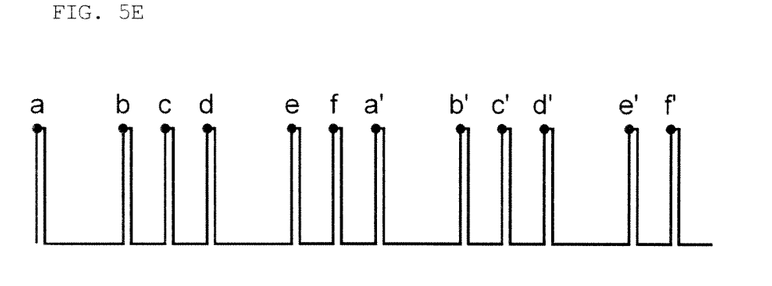

FIG. 5E shows the synthetic pulse signals generated by synthesizing the edge pulse signals, the peak pulse signals, and the reference pulse signals to each other. The motor position and velocity detecting system 200 according to another exemplary embodiment of the present invention may use the synthetic pulse signals generated by synthesizing the edge pulse signals, the peak pulse signals, and the reference pulse signals to each other. Therefore, in the case in which the magnet of the motor has four poles, twelve synthetic pulse signals may be output in one cycle.

The position outputter 240 may output the position of the motor by the synthetic pulse signals generated by synthesizing the edge pulse signals, the peak pulse signals, and the reference pulse signals to each other. In addition, the velocity outputter 250 may output the velocity of the motor by the synthetic pulse signals generated by synthesizing the edge pulse signals, the peak pulse signals, and the reference pulse signals to each other. In the case in which the magnet of the motor has four poles, according to the related art, four pulses are output in one cycle; however, according to another exemplary embodiment of the present invention, twelve synthetic pulse signals may be output in one cycle, such that the output pulses may increase three times as compared to the related art. Therefore, each of the position outputter 240 and the velocity outputter 250 may output the position and the velocity by the synthetic pulse signals increasing three times as compared to the related art.

In addition, the number of comparators 270 and the number of voltage dividers 260 may be plural. Therefore, according to the number of added comparators, the output reference pulse signals may increase several times, and so do the synthetic pulse signals.

A motor position and velocity detecting method according to an exemplary embodiment of the present invention may include: outputting, in a hall sensor, hall signals from rotation of a motor; detecting edge signals from the hall signals to output edge pulse signals; detecting peak signals from the hall signals to output peak pulse signals; outputting synthetic pulse signals generated by synthesizing the edge pulse signals and the peak pulse signals to each other; detecting positions of pulses adjacent to each other in the synthetic pulse signals to detect a position of the motor; and detecting a velocity of the motor using the number of pulses output from the synthetic pulse signals in a preset period.

The edge pulse signals may be output pulse signals for a rising edge signal and a falling edge signal of the hall signal, and the peak pulse signals may be output pulse signals for maximum and minimum points of the sinusoidal wave for the hall signal. That is, the edge pulse signals may be output at the moment when the polarity of the magnet of the motor is changed from an S pole into an N pole and at the moment when the polarity of the magnet of the motor is changed from the N pole into the S pole, and one peak pulse signal may be output at the maximal or maximum point of the hall signal, and one peak pulse signal may be output at the minimal or minimum point of the hall signal. Therefore, in this case, the synthetic pulse signals may be pulse signals generated by synthesizing the edge pulse signals and the peak pulse signals to each other.

Meanwhile, the motor position and velocity detecting method may further include, before the outputting of the synthetic pulse signals, outputting reference pulse signals for the hall signals. In this case, the synthetic pulse signals may be pulse signals generated by synthesizing the edge pulse signals, the peak pulse signals, and the reference pulse signals to each other. A description overlapped with the above-mentioned description will be omitted.

As set forth above, according to the exemplary embodiments of the present invention, the velocity and the position of the motor may be accurately detected without adding the hall sensor and the number of poles of the motor. That is, an error may be reduced in measuring the velocity and the position of the motor, and a time required to measure the velocity and the position of the motor may be reduced half or less as compared to the case according to the related art.

In addition, the comparator is added, thereby making it possible to increase accuracy in detecting the velocity and the position of the motor.

Only an example of the motor velocity and position detecting system according to the exemplary embodiment of the present invention has been described above. Therefore, the present invention is not limited to the above-mentioned example, but may be variously modified by those skilled in the art without departing from the scope of the present invention.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

Accordingly, the scope of the present invention is not construed as being limited to the described embodiments but is defined by the appended claims as well as equivalents thereto.

What is claimed is:

1. A motor position and velocity detecting system comprising:
   a hall sensor outputting hall signals from rotation of a motor;
   an edge detector detecting edge signals for the hall signals to output edge pulse signals;
   a peak detector detecting peak signals for the hall signals to output peak pulse signals;
   a position outputter connected to the edge detector and the peak detector and outputting a position of the motor; and
   a velocity outputter connected to the edge detector and the peak detector and outputting a velocity of the motor,
   wherein the motor position and velocity detecting system uses synthetic pulse signals generated by synthesizing the edge pulse signals and the peak pulse signals to each other.

2. The motor position and velocity detecting system according to claim 1, wherein the edge pulse signals are output pulse signals for the hall signal at the moment when a polarity of a magnet of the motor is changed.

3. The motor position and velocity detecting system according to claim 2, wherein the edge pulse signals are output pulse signals for a rising edge signal and a falling edge signal of the halt signal.

4. The motor position and velocity detecting system according to claim 1, wherein the peak pulse signals are output pulse signals for maximum and minimum points of a sinusoidal wave for the hall signal.

5. The motor position and velocity detecting system according to claim 1, wherein the position outputter outputs the position of the motor by the synthetic pulse signals.

6. The motor position and velocity detecting system according to claim 1, wherein the velocity outputter outputs the velocity of the motor by the synthetic pulse signals.

7. A motor position and velocity detecting system comprising:
   a hall sensor outputting hall signals from rotation of a motor;
   an edge detector detecting edge signals for the hall signals to output edge pulse signals;
   a peak detector detecting peak signals for the hall signals to output peak pulse signals;
   a comparator connected to the hall sensor and outputting reference pulse signals for the hall signals;
   a position outputter connected to the edge detector, the peak detector, and the comparator and outputting a position of the motor; and
   a velocity outputter connected to the edge detector, the peak detector, and the comparator and outputting a velocity of the motor,
   wherein the motor position and velocity detecting system uses synthetic pulse signals generated by synthesizing the edge pulse signals, the peak pulse signals, and the reference pulse signals to each other.

8. The motor position and velocity detecting system according to claim 7, further comprising a voltage divider connected to the peak detector and providing reference signals to the comparator using the peak pulse signals.

9. The motor position and velocity detecting system according to claim 8, wherein the number of comparators and the number of voltage dividers are plural.

10. The motor position and velocity detecting system according to claim 7, wherein the edge pulse signals are output pulse signals for the hall signal at the moment when a polarity of a magnet of the motor is changed.

11. The motor position and velocity detecting system according to claim 10, wherein the edge pulse signals are output pulse signals for a rising edge signal and a falling edge signal of the hall signal.

12. The motor position and velocity detecting system according to claim 7, wherein the peak pulse signals are output pulse signals for maximum and minimum points of a sinusoidal wave for the hall signal.

13. The motor position and velocity detecting system according to claim 8, wherein the position outputter outputs the position of the motor by the synthetic pulse signals.

14. The motor position and velocity detecting system according to claim 8, wherein the velocity outputter outputs the velocity of the motor by the synthetic pulse signals.

15. A motor position and velocity detecting method comprising:
   outputting, in a hall sensor, hall signals from rotation of a motor;
   detecting edge signals from the hall signals to output edge pulse signals;
   detecting peak signals from the hall signals to output peak pulse signals;
   outputting synthetic pulse signals generated by synthesizing the edge pulse signals and the peak pulse signals to each other;
   detecting positions of pulses adjacent to each other in the synthetic pulse signals to detect a position of the motor; and
   detecting a velocity of the motor using the number of pulses output from the synthetic pulse signals in a preset period.

16. The motor position and velocity detecting method according to claim 15, further comprising, before the outputting of the synthetic pulse signals, outputting reference pulse signals for the hall signals.

17. The motor position and velocity detecting method according to claim 16, wherein the synthetic pulse signals are generated by synthesizing the edge pulse signals, the peak pulse signals, and the reference pulse signals to each other.

18. The motor position and velocity detecting method according to claim 15, wherein the edge pulse signals are output pulse signals for a rising edge signal and a falling edge signal of the hall signal.

19. The motor position and velocity detecting method according to claim 15, wherein the peak pulse signals are output pulse signals for maximum and minimum points of a sinusoidal wave for the hall signal.

* * * * *